United States Patent
Gachignard

(10) Patent No.: US 8,421,843 B2
(45) Date of Patent: Apr. 16, 2013

(54) SYSTEM AND METHOD FOR PROCESSING IMAGES BY VISUAL ECHO CANCELLATION

(75) Inventor: Olivier Gachignard, Montrouge (FR)

(73) Assignee: France Telecom, Paris (FR)

( * ) Notice: Subject to any disclaimer, the term of this patent is extended or adjusted under 35 U.S.C. 154(b) by 1462 days.

(21) Appl. No.: 11/990,557

(22) PCT Filed: Sep. 7, 2006

(86) PCT No.: PCT/FR2006/050850
§ 371 (c)(1),
(2), (4) Date: Feb. 15, 2008

(87) PCT Pub. No.: WO2007/028928
PCT Pub. Date: Mar. 15, 2007

(65) Prior Publication Data
US 2009/0251527 A1 Oct. 8, 2009

(30) Foreign Application Priority Data
Sep. 8, 2005 (FR) ..................... 05 09152

(51) Int. Cl.
*H04N 7/14* (2006.01)
(52) U.S. Cl.
USPC ..................................... 348/14.16
(58) Field of Classification Search ............. 348/14.16, 348/14.07–14.08, 14.09, 14.1, 14.12–14.15
See application file for complete search history.

(56) References Cited

U.S. PATENT DOCUMENTS

| 5,400,069 | A | | 3/1995 | Braun et al. | |
|---|---|---|---|---|---|
| 5,666,155 | A | * | 9/1997 | Mersereau | 348/14.16 |
| 6,507,357 | B2 | * | 1/2003 | Hillis et al. | 348/14.16 |
| 6,882,358 | B1 | * | 4/2005 | Schuster et al. | 348/14.16 |
| 2004/0239755 | A1 | * | 12/2004 | Kjesbu et al. | 348/14.08 |
| 2005/0237381 | A1 | * | 10/2005 | White | 348/14.16 |

FOREIGN PATENT DOCUMENTS

| EP | 0 586 198 | 3/1994 |
|---|---|---|
| FR | 2 858 431 | 2/2005 |
| JP | 11-355742 A | 12/1999 |
| WO | WO 03/077095 | 9/2003 |

* cited by examiner

*Primary Examiner* — Brandon Miller
(74) *Attorney, Agent, or Firm* — Knobbe Martens Olson & Bear LLP

(57) ABSTRACT

This image processing system comprises: a device (PRJ, $SI_1$) for projecting a first light beam (FL1) to form a first image (I1) on a screen (ECR) on which a second light beam (FL2) coming from an observation area (ZO) forms a second image (I2) and a device (CAM, $SI_1$) for acquiring a third image (I3) formed on the screen (ECR) and corresponding to the superimposition of the second image (I2) and at least a portion (I1') of the first image (I1). This system further comprises control means (CTR) for: obtaining a first signal (S1) representing the portion (I1') of the first image (I1), obtaining a second signal (S2) representing the third image (I3), and calculating a third signal (S3) by subtracting at least part of the first signal (S1) from the second signal (S2) to form an image (I2') representing the observation area (ZO).

9 Claims, 3 Drawing Sheets

SYSTEM AND METHOD FOR PROCESSING IMAGES BY VISUAL ECHO CANCELLATION

RELATED APPLICATIONS

This is a U.S. National Phase Application under 35 USC 371 of International Application PCT/FR2006/050850, filed on Sep. 7, 2006.

This application claims the priority of French application no. 05/09152 filed Sep. 8, 2005 the entire content of which is hereby incorporated by reference.

FIELD OF THE INVENTION

The present invention relates to the general field of image processing and more particularly to interpersonal communication installations that exchange video images, such as videoconference systems.

BACKGROUND OF THE INVENTION

Videoconference systems include a projection device that forms images on a screen from a video stream received from a remote site and an acquisition device (typically a video camera) that films an observation area to generate a stream to be sent to the remote site.

In interpersonal communication audiovisual systems, the users are filmed by the video camera and simultaneously they observe a screen on which an image of their remote correspondent is displayed.

In some systems, the video camera is placed beside or above the screen.

This filming angle yields a skewed or downward view that is not natural. Moreover, as users are looking at the screen and not at the video camera, their correspondents have the impression that they are not making eye contact as they would in a normal face-to-face conversation.

A known way to solve this problem, shown in FIG. 1, is to use a partially transparent mirror MIR placed obliquely in front of the screen ECR and reflecting toward the video camera CAM an image of the observers situated in the observation area ZO.

The virtual position of the video camera CAM can therefore be placed in the middle of the screen ECR or behind it, where the face of a remote correspondent is displayed.

However, that system has a number of disadvantages linked in particular to the overall size and weight of the oblique mirror MIR, which furthermore imposes a minimum distance between the observers and the screen ECR.

What is more, because the area that is located behind the mirror relative to the video camera (above the mirror MIR in FIG. 1) is in the field of view of the video camera through the mirror, its image is superimposed on the image of the users, which introduces artefacts that are a nuisance.

Other artefacts are caused by reflections in the mirror MIR that are also superimposed on the image displayed on the screen ECR.

OBJECT AND SUMMARY OF THE INVENTION

In this context, an object of the invention is to place a video camera freely behind the screen while eliminating the drawbacks and constraints referred to above.

To this end, one aspect of the invention is directed to an image processing system comprising:

a device for projecting a first light beam to form a first image on a screen on which a second light beam coming from an observation area forms a second image; and a device for acquiring a third image formed on the screen and corresponding to the superimposition of the second image and at least a portion of the first image.

This system further comprises control means for:

obtaining a first signal representing the aforementioned portion of the first image;

obtaining a second signal representing the third image; and calculating a third signal by subtracting at least part of the first signal from the second signal to form an image representing the observation area.

The general principle of the invention is therefore to subtract in real time the video stream received from the remote site and intended to be projected on the screen from the images acquired by the acquisition device. In practice, it is a question of matching levels between the output signal of the video camera and the input signal of the projection device.

The control means preferably multiply the first signal by a weighting coefficient and subtract the signal resulting from this multiplication from the second signal to obtain the third signal.

The image processing system according to an embodiment of the invention preferably includes a brightness sensor for obtaining the weighting coefficient as a function of the brightness.

This feature advantageously provides adaptive filtering that corrects brightness variations in real time. More particularly, if the brightness of the observation area increases (respectively decreases), then the video camera requires less (respectively more) light, but the video stream from the video projector must be more (respectively less) bright in order to enhance the perception of the user.

The weighting coefficient is from 0 to 1. In a controlled lighting environment (room with no windows) it can be made equal to 0.5.

If there is daylight in the room, this weighting coefficient can be reduced, for example to 0.4.

On the contrary, if the room should darken, for example because of a defective light, the weighting coefficient can be increased, for example to 0.7.

In a preferred embodiment, the projection device of the image processing system of the invention includes a projector connected to a data processing system by an electrical connection carrying signals representing the first image and a lossless diverter element on the connection that duplicates the signals to form the first signal.

In a preferred embodiment, the image processing system of the invention includes means for converting the first signal and/or the second signal into a format suitable for calculating the third signal.

For example, in one particular embodiment, the video camera generates a video format second signal that is converted into the RGB format before subtracting the first signal obtained at the input of the projector, that first signal also being in the RGB format in this particular embodiment.

The image processing system of the invention preferably includes means for sending the third signal to a remote device, for example for a videoconference application.

Another aspect of the invention is directed to an image processing method that can be implemented in an image processing system comprising:

a device for projecting a first light beam to form a first image on a screen on which a second light beam coming from an observation area forms a second image; and a device for acquiring a third image formed on the screen and corresponding to the superimposition of the second image and at least a portion of the first image; the first image and the third image being stored in a data processing system in the form of files.

This method comprises:

a step of reading first digital data representing the portion of the first image from the file storing the first image;

a step of reading second digital data representing the third image from the file storing the third image; and a step of calculating third digital data obtained by subtracting at least part of the first digital data from the second digital data to form an image representing the observation area.

In a preferred embodiment, the steps of the image processing method are determined by computer program instructions.

Another aspect of the invention is directed to a computer program on an information medium that can be executed in a computer and includes instructions adapted to execute steps of the above image processing method.

This program can use any programming language and take the form of source code, object code or an intermediate code between source code and object code, such as a partially compiled form, or any other desirable form.

Another aspect of invention is directed to a computer-readable information medium containing instructions of a computer program as referred to above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Also, the information medium can be a transmissible medium such as an electrical or optical signal, which can be routed via an electrical or optical cable, by radio or by other means. The program according to the invention can in particular be downloaded over an Internet-type network.

Alternatively, the information medium can be an integrated circuit into which the program is incorporated and which executes the method in question or is used in its execution.

DETAILED DESCRIPTION OF ONE EMBODIMENT

Figure 2:
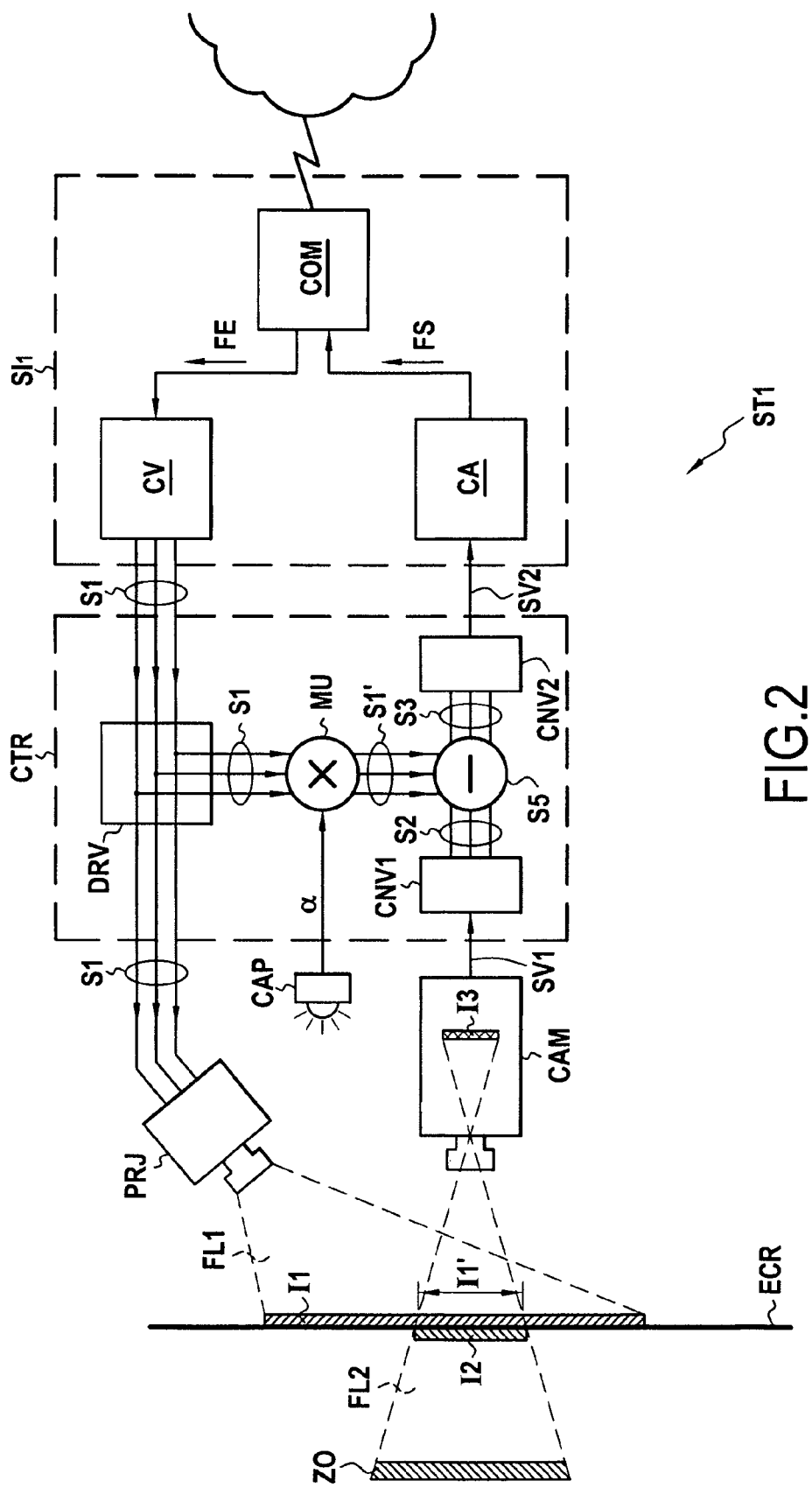
FIG. 2 shows a first embodiment of an image-processing device according to the invention.

FIG. 2 shows a first embodiment of an image processing system ST1 according to the invention.

The system includes a screen ECR onto which a projector PRJ projects a first light beam FL1 to form a first image I1 on the screen.

The image I1 is a video image from an incoming stream FE received via a communication card COM of an information system $SI_1$ from a remote site, not shown.

The incoming stream FE is processed by a video card CV that is integrated into the data processing system $SI_1$ and generates a signal S1 with three components R, G, B that are fed to the input of the projector PRJ.

The image processing system ST1 also includes an acquisition device consisting primarily of a video camera CAM and an acquisition card CA integrated into the data processing system $SI_1$.

The outgoing stream FS from the acquisition card CA is sent to the remote site via the communication card COM.

The video camera CAM and the projector PRJ are on the same side of a half-plane delimited by the screen ECR.

The camera CAM films an observation area ZO on the other side of the screen ECR.

In other words, the observation area ZO produces a second image I2 on the screen ECR that is superimposed on a portion I1' of the first image I1 formed by the projector PRJ.

The person skilled in the art will understand that the video camera CAM in reality acquires a third image I3 formed on the screen ECR and corresponding to the second image I2 superimposed on the portion I1' of the first image I1.

In the embodiment described here, the output signal SV1 from the video camera CAM corresponding to the successive images I3 conforms to the S-video standard.

In the preferred embodiment described here, the image processing system ST1 according to the invention includes a brightness sensor CAP adapted to provide a weighting coefficient $\alpha$ from 0 to 1 as a function of brightness; the darker the environment, the closer to 1 this weighting coefficient.

In this first embodiment, the image processing system ST1 comprises firstly a controller CTR between the data processing system SI1, and secondly the projector PRJ and the video camera CAM.

The controller CTR includes a lossless diverter element DRV that receives as input the signal S1 with RGB components from the video card CV of the data processing system SI1 and forwards the signal S1 to the projector PRJ as described above.

This lossless diverter element DRV also duplicates the signal S1 and redirects it toward a multiplier MU which receives the weighting coefficient $\alpha$ from the brightness sensor CAP at another input.

The multiplier MU therefore supplies as output a signal S1' with RGB components each of which is obtained by multiplying the corresponding component of the signal S1 by the weighting coefficient $\alpha$.

The controller CTR also includes conversion means CNV1 that receive as input the signal $SV_1$ in the S-video format supplied by the video camera CAM and convert this S-video signal into a second signal S2 with RGB components.

The controller CTR includes a subtractor SS with a first input that receives the output signal S2 of the conversion means CNV1 and a second input that receives the output signal of the multiplier MU.

This subtractor SS provides as output a third signal S3 obtained by subtracting the signal received at its second input from the signal S2 received at its first input.

This third signal S3 represents an image I2' of the observation area ZO. It is supplied as input to a second converter CNV2 which converts the signal S3 with RGB components into a signal $SV_2$ conforming to the S-video standard.

The signal $SV_2$ is supplied as input to the acquisition card CA of the data processing system $SI_1$ to be forwarded to the remote site via the communication card COM.

Figure 3:
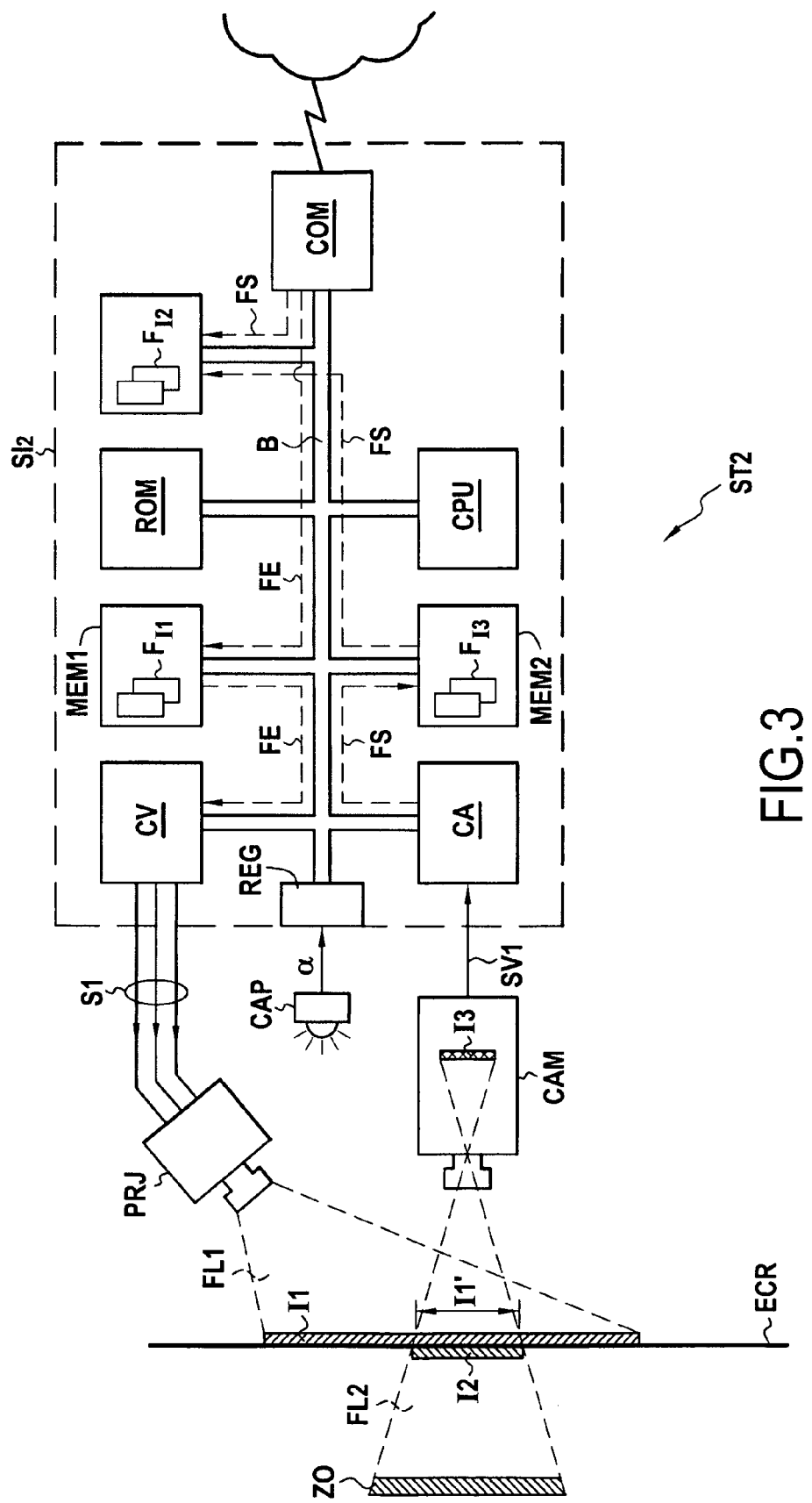
FIG. 3 shows a second embodiment of an image-processing device according to the invention.

FIG. 3 represents a second embodiment of an image processing system according to the invention.

Elements in this figure common to elements in FIG. 2 carry the same references.

The image processing system ST2 includes a data processing system SI1 comprising elements connected by a bus B including the video card CV, the acquisition card CA, and the communication card COM described above.

On this bus B there is a register REG that stores the weighting coefficient α supplied by the brightness sensor CAP.

Figure 1:
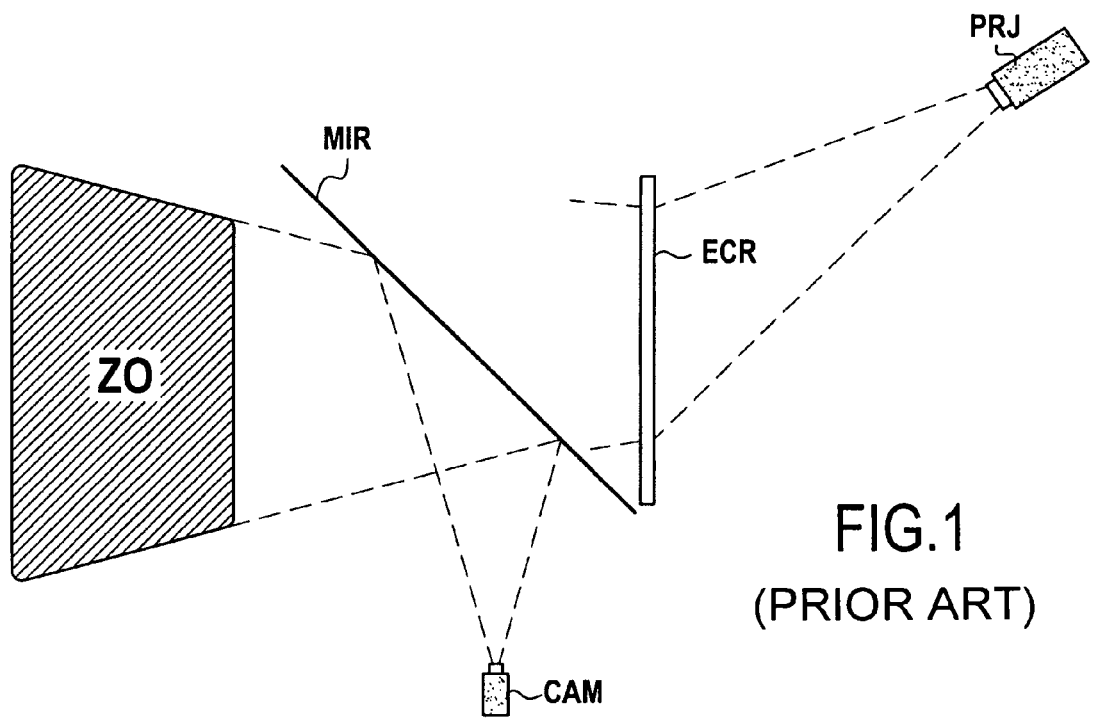
FIG. 1 is a diagram of a prior art installation.
Figure 4:
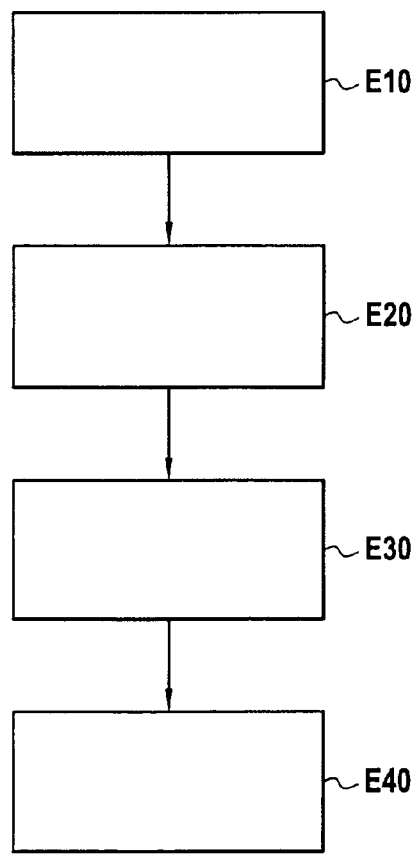
FIG. 4 is in the form of a flowchart showing the main steps of a preferred embodiment of an image processing method according to the invention.

The data processing system SI2 described here is based on a computer. It includes a processor CPU and a read-only memory ROM containing a computer program that executes the steps of the image processing method according to the invention represented in flowchart form in FIG. 4.

The data processing system SI2 also includes random-access memory RAM for storing temporary variables necessary for execution of this data processing program by the processor CPU.

In the preferred embodiment described here, the incoming stream FE received via the communication card COM is buffered in a fast-access memory MEM1 accessible to the video card CV.

Similarly, the outgoing stream FS generated by the acquisition card CA is stored in a fast-access memory MEM2.

It is assumed here that each image I1 from the incoming stream FE is stored in the fast-access memory MEM1 in the form of a computer file $F_{I1}$, and that each image output by the acquisition card CA is stored in the fast-access random access memory MEM2 in the form of a digital file $F_{I3}$.

First digital data DN1 represents the portion I1' of the first image I1 that overlaps the second image I2 on the screen ECR.

Second digital data DN2 represents the third image I3 acquired by the video camera CAM.

It is assumed that if the acquisition card CA stores in the fast-access memory MEM2 a file $F_{I3}$ corresponding to an image I3 acquired by the video camera CAM, then that acquisition card generates a signal, not shown here, sent to the processor CPU.

On reception of this signal, the processor executes a first step E10 during which it reads the first digital data DN1 representing the portion I1' of the first image I1 from the file $F_{I1}$ projected onto the screen ECR at the moment of acquisition of the image I3 by the video camera CAM.

This step E10 is followed by a second or reading step E20 during which the processor CPU obtains the second digital data DN2 referred to above by reading the file $F_{I3}$ storing the image I3.

This reading step D20 is followed by the step E30 during which the processor CPU reads the value of the weighting coefficient α from the register REG.

This reading step is followed by a step in which the processor CPU calculates third digital data obtained by subtracting from the second digital data DN2 the product of the first digital data DN1 and the weighting coefficient α.

The third digital data DN3 is stored in the form of a file $F_{I2}$ in the random-access memory RAM, this file representing an image I2' representing the observation area ZO.

The computer files $F_{I2}$ constitute the outgoing video stream FS sent to the remote site.

The invention claimed is:

1. An image processing system comprising:
    a projection device for projecting a first light beam to form a first image on a screen on which a second light beam coming from an observation area forms a second image;
    an acquisition device for acquiring a third image formed on said screen and corresponding to the superimposition of said second image and at least a portion of said first image; and
    control means for:
    obtaining a first signal representing said portion of the first image;
    obtaining a second signal representing said third image; and
    calculating a third signal by subtracting at least part of said first signal from said second signal to form an image representing said observation area.

2. The system according to claim 1, wherein said control means multiply said first signal by a weighting coefficient (α) and subtract the signal resulting from said multiplication from said second signal to obtain said third signal.

3. The system according to claim 2, further comprising a brightness sensor for obtaining said weighting coefficient (α) as a function of said brightness.

4. The system according to claim 1, wherein said projection device includes a projector connected to a data processing system by an electrical connection carrying signals representing said first image and a lossless diverter element on said connection that duplicates said signals to form said first signal.

5. The system according to claim 1, further comprising converting means for converting said first signal and/or said second signal into a format suitable for calculating said third signal.

6. The system according to claim 1, further comprising communications means for sending said third signal to a remote device.

7. An image processing method that can be implemented in an image processing system comprising:
    a projection device for projecting a first light beam to form a first image on a screen on which a second light beam coming from an observation area forms a second image; and
    an acquisition device for acquiring a third image formed on said screen and corresponding to the superimposition of said second image and at least a portion of said first image;
    said first image and said third image being stored in a data processing system in the form of files, wherein said method comprises:
    a step of reading first digital data representing said portion of the first image from said file storing said first image;
    a step of reading second digital data representing the third image from said file storing said third image; and
    a step of calculating third digital data obtained by subtracting at least part of said first digital data from said second digital data to form an image representing said observation area.

8. A computer program including instructions for executing steps of the image processing method according to claim 7 when said program is executed by a computer.

9. A computer-readable storage medium on which is stored a computer program comprising instructions for executing steps of the image processing method according to claim 7.

* * * * *